C. BORNMANN.
FINDER FOR CAMERAS.
APPLICATION FILED MAR. 13, 1915.

1,180,252.

Patented Apr. 18, 1916.

Witnesses:
A. R. Appleman
F. M. Ornshack

Inventor.
Carl Bornmann.
By his Attorney
Phillips Abbott.

UNITED STATES PATENT OFFICE.

CARL BORNMANN, OF BINGHAMTON, NEW YORK, ASSIGNOR TO ANSCO COMPANY, OF BINGHAMTON, NEW YORK, A CORPORATION OF NEW YORK.

FINDER FOR CAMERAS.

1,180,252.  Specification of Letters Patent.  Patented Apr. 18, 1916.

Application filed March 13, 1915. Serial No. 14,087.

*To all whom it may concern:*

Be it known that I, CARL BORNMANN, a citizen of the United States, and a resident of the city of Binghamton, county of Broome, and State of New York, have invented a new and useful Improvement in Finders for Cameras, of which the following is a specification.

My invention relates to a finder of the folding type.

A serious objection to all folding finders, as heretofore made, so far as I am aware, has been that the sides of the finder are open, through which openings side lights and dust are admitted. The dust soon dulls the lens, mirror and observation plate and because of the side lights the image is much reduced in brilliancy.

My improvement consists in so constructing the finder that all its sides are closed except those that contain the lens and the observation plate, thus overcoming the difficulties above mentioned since dust is excluded and all light except that which enters through the lens is cut off. The construction also makes the finder appear as a solid body, materially improving its appearance while still retaining the convenience of folding; and finally the finder can be opened completely and more easily than any other known to me, for the purpose of cleaning.

Figure 1:
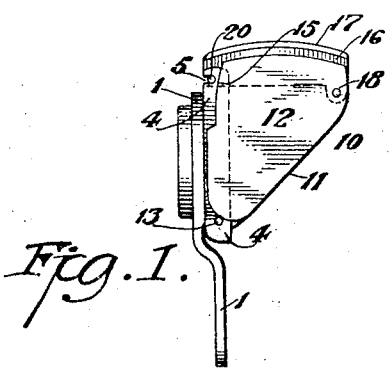
Figure 2:
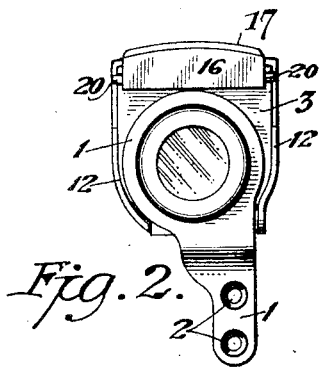
Figure 3:
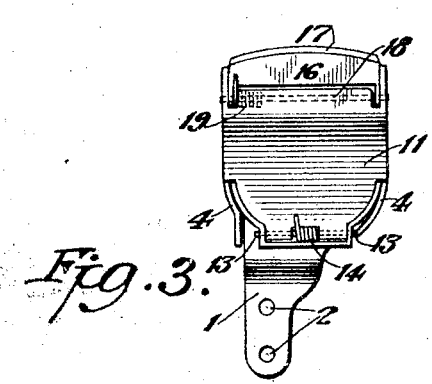
Figure 4:
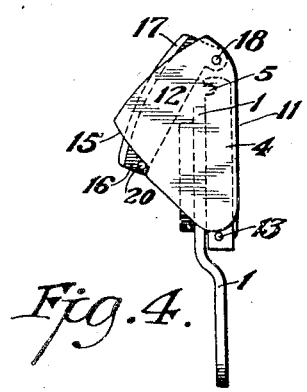
Figure 5:
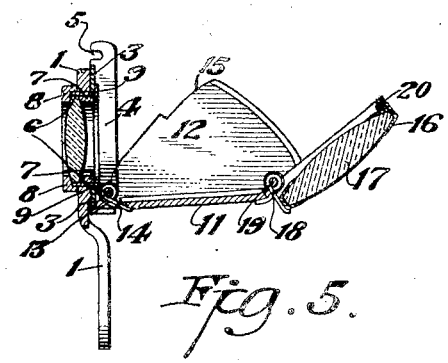

Referring to the drawings, Figure 1 is a sidewise elevation of the finder in position for use; Fig. 2 is a front elevation of the finder; Fig. 3 is a rear elevation of the finder; Fig. 4 is a sidewise elevation of the finder folded; Fig. 5 is a vertical sectional view of the finder through about its medial line, the parts being opened out for cleaning.

In the drawings, 1 represents a bracket, or equivalent device, whereby the finder may be attached to and suitably supported upon the desired part of the camera structure, as is well understood. I show screw holes 2 in the bracket for this purpose. Any other suitable means for supporting the finder may be employed.

3 (See Fig. 5) is the front plate of the finder. It is centrally perforated, as usual, for the exposure opening, and is provided with side flanges 4, 4, near the upper end of each of which is an open sided notch 5.

6 (see Fig. 5) is the lens-supporting tube. It is provided with an inner washer 7 and an outer confining ring 8, or any other suitable construction may be employed. The inner end of the tube 6 is turned over outwardly as at 9, thus holding the front plate 3 in position in such manner that it and all the other parts can make partial rotation by a slipping action about the upper part of the bracket 1.

10 (see Fig. 1) is the main or body part of the finder. It comprises a back plate 11 and two triangularly shaped side plates 12, 12. The back plate is pivoted at its lower edge by a pintle 13 to the lower ends of the flanges 4, 4, of the front plate and it has a spring 14, in this instance shown as coiled about the pintle, which normally maintains the body part in its retracted or non-folded position. At the upper front edge of each side plate there is a cut away part 15 which acts as a guide and stop for certain pins about to be described on the free edge of the top plate 16 of the finder. This plate carries the usual observation glass 17 and is pivoted at its rear edge to the upper edge of the back plate 11 by a pintle 18 similar to the pintle 13. It also has a spring 19 which normally tends to close the top plate down upon the upper edges of the side plates. At each front corner of the top plate there is a laterally projecting pin 20, which when the top plate is in operative position, as shown best in Figs. 1 and 2, engages in the notches 5, 5, in the upper ends of the flanges 4, 4, of the front plate, thus holding the body part and the top plate against the stress of the spring 14, which normally tends to throw them over backwardly, and the relation between the parts is such that when the finder is folded and the body part and the top plate are swung forwardly over the upper edge of the front plate, as shown in Fig. 4, that the pins 20 will drop into and be guided by the cut out guideways 15 in the side flanges of the front plate and the spring 19 will then, acting through the pins 20, and the guideways, overcome or counteract the stress of the spring 14, so that the parts will then remain at rest in their then folded position.

From the foregoing the operation is obvious. When the parts are in the operative position shown in Fig. 1, the entire finder is inclosed because of the presence of the side plates and no dust or but little of it can enter, and practically no light can do so except through the lens. If the operator desires to take a vertical picture instead of a horizontal one, then the finder is given a quarter turn on its bracket and the camera being correspondingly manipulated, the exposure will be made as before, for there has been no change in the relative positions of the operative parts. When it is desired to fold the finder mere pressure on its rear upper edge will cause the body part and the top plate to slide over forwardly into the position shown in Fig. 4, which brings the forward line of the parts into the same plane as the other parts of the lens supporting frame and the slight projection of these parts rearwardly is of no consequence because there is always vacant space sufficient for their reception adjacent to the small end of the bellows. When it is desired to clean the lens, the mirror and the observation plate, then the parts are folded outwardly and rearwardly, as shown in Fig. 5, against the stress of the two springs 14 and 19.

It will be obvious to those who are familiar with such matters that changes may be made in the details of the construction shown and described and yet the essentials of the invention be retained. I therefore do not limit myself to such details.

I claim:-

1. A folding finder the body part whereof is pivotally connected to the front plate and comprises a continuous back plate and continuous side plates.

2. A folding finder the body part whereof is pivotally connected to the front plate and comprises a continuous back plate and continuous side plates and a top plate pivotally connected to the body part.

3. A folding finder the body part whereof is pivotally connected to the front plate and comprises a continuous back plate and continuous side plates, a top plate pivoted to the body part and a spring at each pivotal connection which normally cause the body part and the top plate to assume and maintain operative positions.

4. A folding finder the body part whereof is pivotally connected to the front plate, a top plate pivotally connected to the body part and a spring at each pivotal connection which normally cause the body part and the top plate to assume and maintain operative positions.

5. A folding finder the body part whereof is pivotally connected to the front plate, a top plate pivotally connected to the body part, and a spring at each pivotal connection which normally cause the body part and the top plate to assume and maintain operative positions and means on the body part and on the top plate which coöperate to hold the parts in proper relative positions against the stress of said springs when they are folded.

6. A folding finder the body part whereof is pivotally connected to the front plate and which comprises a top plate, a back plate and two side plates, the top plate adapted to fold on one side and the back plate on the opposite side of the front plate and means whereby the body part will be maintained in both folded and distended positions.

7. A folding finder the body part whereof comprises a top plate, a back plate and two side plates, the back plate being pivoted at its lower edge to the lower edge of the front plate, and the top plate pivoted at its rear edge to the top edge of the back plate, a spring at each of said pivotal points and disengageable engaging devices on the front edge of the top plates and on the front supporting plate whereby the body part and the top plates are normally held in operative positions.

8. A folding finder the body part whereof comprises a top plate, a back plate and two side plates, the back plate being pivoted at its lower edge to the lower edge of the front plate and the top plate pivoted at its rear edge to the top edge of the back plate, a spring at each of said pivotal points whereby the body part and the top plate are normally held in operative positions and disengageable means on the top plate and on the side plates which coöperate to hold these parts in proper relative positions against the stress of the springs when they are folded and whereby also the top plate may be folded out rearwardly exposing the interior of the finder.

In testimony whereof I have signed my name to this specification in the presence of two subscribing witnesses.

CARL BORNMANN.

Witnesses:
 HENRY F. MEEHAN,
 ERNEST W. SCHULZ.